(12) United States Patent
Browning et al.

(10) Patent No.: US 12,085,932 B2
(45) Date of Patent: Sep. 10, 2024

(54) COCKPIT MISSION CONTROLLER WITH INTEGRATED KEYBOARD

(71) Applicant: LOCKHEED MARTIN CORPORATION, Bethesda, MD (US)

(72) Inventors: Jason E. Browning, Ithaca, NY (US); Elissa Sue Ciganik, Tallmadge, OH (US); Kathryn P. Guy, Binghamton, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 264 days.

(21) Appl. No.: 17/725,909

(22) Filed: Apr. 21, 2022

(65) Prior Publication Data

US 2023/0341845 A1    Oct. 26, 2023

(51) Int. Cl.
  *G05D 1/00* (2024.01)
  *B64C 39/02* (2023.01)
  (Continued)

(52) U.S. Cl.
  CPC ......... *G05D 1/0016* (2013.01); *B64C 39/024* (2013.01); *G05D 1/101* (2013.01);
  (Continued)

(58) Field of Classification Search
  CPC .... G05D 1/0016; G05D 1/101; B64C 39/024; B64C 13/042; G06F 3/0362;
  (Continued)

(56) References Cited

U.S. PATENT DOCUMENTS

| 5,059,970 A | 10/1991 | Raubenheimer et al. |
| 5,758,297 A | 5/1998 | Gaultier |

(Continued)

FOREIGN PATENT DOCUMENTS

| EP | 3 132 619 B1 | 2/2017 | |
| WO | WO-2016154941 A1 * | 10/2016 | ........... B64C 39/024 |
| WO | WO-2019/105231 A1 | 6/2019 | |

OTHER PUBLICATIONS

"DJI Mavic Air 2 Zoom Using Scroll Wheel"; YouTube video youtu.be/j4mEOv6kP_0?si=QmlcpAfiPC0QGLWb uploaded Sep. 7 2020, (Year: 2020).*

(Continued)

*Primary Examiner* — Peter D Nolan
*Assistant Examiner* — Tanya C Sienko
(74) *Attorney, Agent, or Firm* — Foley & Lardner LLP

(57) ABSTRACT

A handheld device and method for entering data and controlling functions of an aerial vehicle are disclosed. The handheld device includes an interface that communicates with a processor and a memory of the aerial vehicle; input devices that receive input from an operator of the handheld device, a display device that displays information related to the input received from the operator via the input devices, and one or more processors. The one or more processors can receive input data from the input devices to modify a field value maintained in the memory of the aerial vehicle. The one or more processors can present, at the display device, an output data corresponding to the input data, and periodically transmit one or more signals to modify the field value maintained in the memory of the aerial vehicle via the interface based on the input data.

18 Claims, 6 Drawing Sheets

(51) Int. Cl.
*G06F 3/0362* (2013.01)
*G06F 3/0482* (2013.01)

(52) U.S. Cl.
CPC .......... *G06F 3/0362* (2013.01); *G06F 3/0482* (2013.01); *B64U 2201/20* (2023.01)

(58) Field of Classification Search
CPC ........... G06F 3/0482; G06F 2203/0383; G06F 3/0338; G06F 3/038; B64U 2201/20
See application file for complete search history.

(56) References Cited

U.S. PATENT DOCUMENTS

| | | | |
|---|---|---|---|
| 6,064,922 A | 5/2000 | Lee | |
| 6,264,146 B1 | 7/2001 | Hill et al. | |
| 10,331,233 B2 * | 6/2019 | Parazynski | G06F 3/0346 |
| 2014/0297067 A1 * | 10/2014 | Malay | G05D 1/0094 |
| | | | 701/4 |
| 2022/0411053 A1 * | 12/2022 | Baumgartner | F41G 9/002 |

OTHER PUBLICATIONS

"How to print user input data on screen", from StackOverflow.com forum, asked Aug. 3, 2013, answered/edited Jan. 19, 2016 (Year: 2016).*

"8+ Hidden Settings/Features You Didn't Know The DJI Mavic Air 2 Has!" (Carson Miller) uploaded Jun. 8, 2020 youtu.be/dSv-Ar6W_X0?si=36pAdrWb3TirkFUD (Year: 2020).*

Extended European Search Report on European Patent Application No. 23165370.0 dated Aug. 28, 2023 (10 pages).

Matthew J. Carrico, "Mobile Device Integration in the Cockpit: Benefits, Challenges, and Recommendations", IEEE/AIAA 34th Digital Avionics Systems Conference (DASC), Oct. 29, 2015, https://ieeexplore.ieee.org/document/7311393 (15 pages).

* cited by examiner

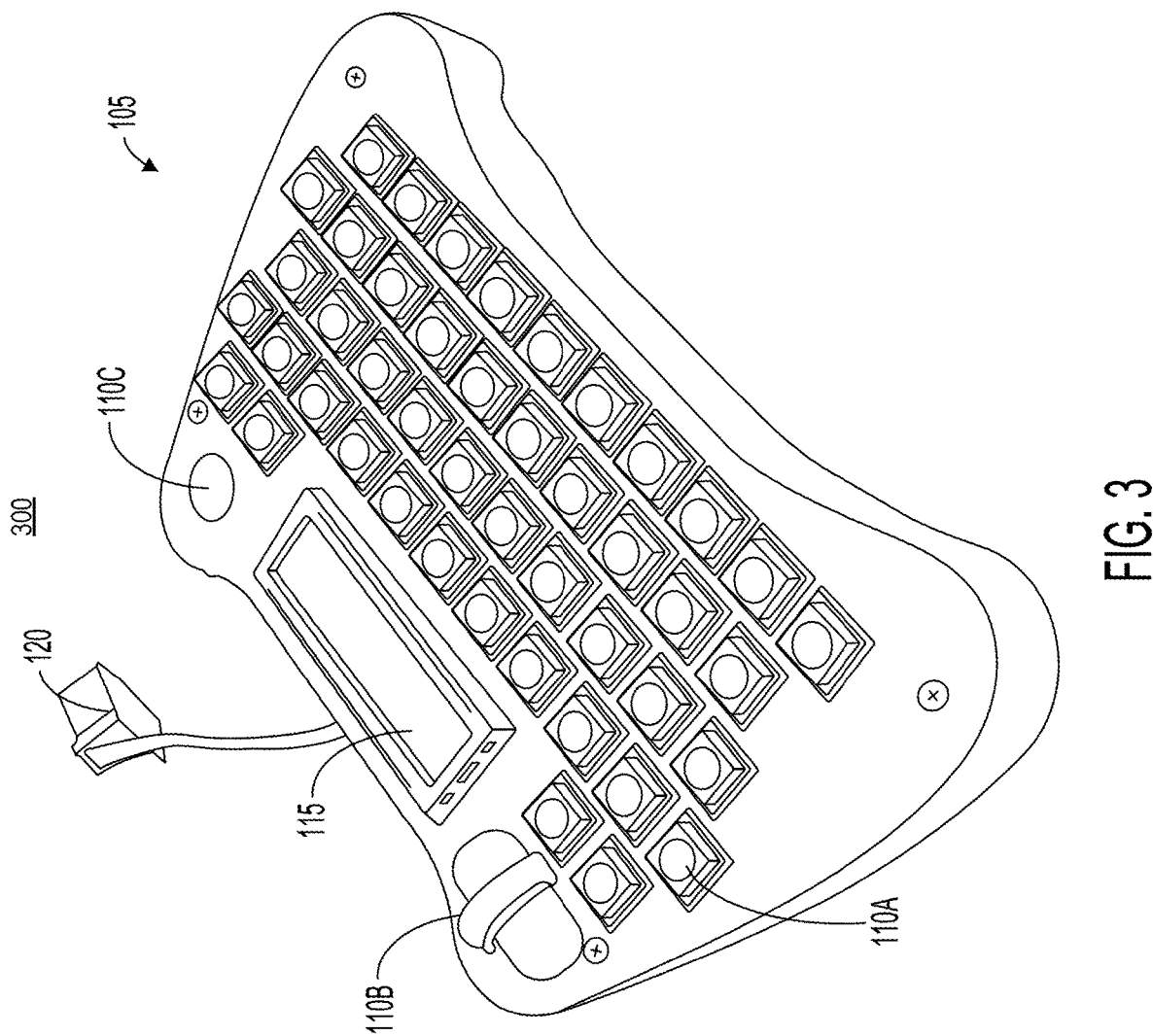

500

COCKPIT MISSION CONTROLLER WITH INTEGRATED KEYBOARD

TECHNICAL BACKGROUND

This disclosure relates to a handheld input device including an integrated keyboard that can be used in the operation of an aerial vehicle.

BACKGROUND

Aerial vehicles, such as airplanes and other manually piloted aircraft, can include input devices used by a pilot or operator to control aspects of the aerial vehicle. However, it can be challenging to effectively and efficiently operate the aerial vehicle under various aerial circumstances.

SUMMARY

The systems and methods of this technical solution provide a cockpit mission controller with integrated keyboard. The cockpit mission controller can be used to provide several different types of input to operate an aerial vehicle. The systems and methods described herein allow a pilot or another operator of the aerial vehicle enter data and control mission functions from a single handheld device with an integrated keyboard and other input devices. Advanced mission system displays can use menu navigation which can be exercised quickly via a scroll wheel included on the handheld device. The operator or pilot can slew camera or weapon controls via a joystick style input device. The handheld controller can interface with the fixed systems of the aerial vehicle using a wired or wireless interface. The handheld device can be mounted or tethered (or a combination) to any portion of the aerial vehicle to improve the controls available to operators of the aerial vehicle.

At least one aspect of the present disclosure is directed to a handheld device for entering data and controlling functions of an aerial vehicle. The handheld device can include an interface that communicates with a processor and a memory of the aerial vehicle. The handheld device can include a plurality of input devices that receive input from an operator of the handheld device. The handheld device can include a display device that displays information related to the input received from the operator via the plurality of input devices. The handheld device can include one or more processors, in communication with the plurality of input devices and the display device. The one or more processors can receive input data from one or more of the plurality of input devices to modify a field value maintained in the memory of the aerial vehicle. The one or more processors can present, at the display device, an output data corresponding to the input data. The one or more processors can transmit one or more signals to modify the field value maintained in the memory of the aerial vehicle via the interface based on the input data.

In some implementations, the plurality of input devices comprises a scroll wheel. In some implementations, the plurality of input devices comprises a joystick. In some implementations, the one or more signals are configured to control a camera of the aerial vehicle or a weapon system of the aerial vehicle. In some implementations, the interface is one of an Ethernet interface, a serial interface, or a discrete signal interface. In some implementations, the handheld device can include a mount that couples the handheld device to the aerial vehicle. In some implementations, the one or more processors can present the field value on the display device as the field value is modified.

In some implementations, the one or more processors can communicate with a software layer executed by the processor of the aerial vehicle to select the field value in response to receiving a second input via the plurality of input devices. In some implementations, the one or more processors can receive, via the interface, the field value maintained in the memory of the aerial vehicle for display at the display device. In some implementations, the one or more processors can generate, based on the input data received from the one or more of the plurality of input devices, the one or more signals comprising a binary value corresponding to a state of each of the plurality of input devices. In some implementations, the one or more processors can transmit, via the interface to the processor of the aerial vehicle, the one or more signals at a predetermined frequency.

In some implementations, the one or more processors can periodically transmit the one or more signals to modify the field value in the memory of the aerial vehicle. In some implementations, the one or more processors can receive, via the interface, one or more field values from the processor of the aerial vehicle. In some implementations, the one or more processors can display, at the display device, the one or more field values in a menu.

At least one other aspect of the present disclosure is directed to a method. The method can include receiving input data from one or more of the plurality of input devices to modify a field value maintained in a memory of an aerial vehicle in communication with the handheld device. The method can include presenting, at the display device, an output data corresponding to the input data. The method can include transmitting, via an interface, one or more signals to modify the field value maintained in the memory of the aerial vehicle via the interface based on the input data.

In some implementations, the plurality of input devices comprises a joystick or a scroll wheel. In some implementations, the method can include receiving a signal to control a camera or a weapon system of the aerial vehicle via the joystick or the scroll wheel. In some implementations, transmitting the one or more signals is performed via an Ethernet interface, a serial interface, or a discrete signal interface. In some implementations, the method can include presenting, by the one or more processors, the field value on the display device as the field value is modified.

In some implementations, the method can include communicating with a software layer executed by a processor of the aerial vehicle to select the field value in response to receiving a second input via the plurality of input devices. In some implementations, the method can include receiving, via the interface, the field value maintained in the memory of the aerial vehicle for display at the display device. In some implementations, the method can include transmitting the one or more signals at a predetermined frequency. In some implementations, the method can include transmitting the one or more signals to modify the field value in the memory of the aerial vehicle after displaying the output data at the display device and responsive to receiving a second input from at least one of the plurality of input devices.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks or other non-transitory storage media) or intangible carrier media (e.g. communication signals). Aspects may also be implemented using suitable apparatus, which may take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 depicts a perspective view of the handheld device for entering data and controlling functions of an aerial vehicle shown in FIGS. 2A, 2B, and 2C, in accordance with one or more implementations;

DETAILED DESCRIPTION

Figure 1:
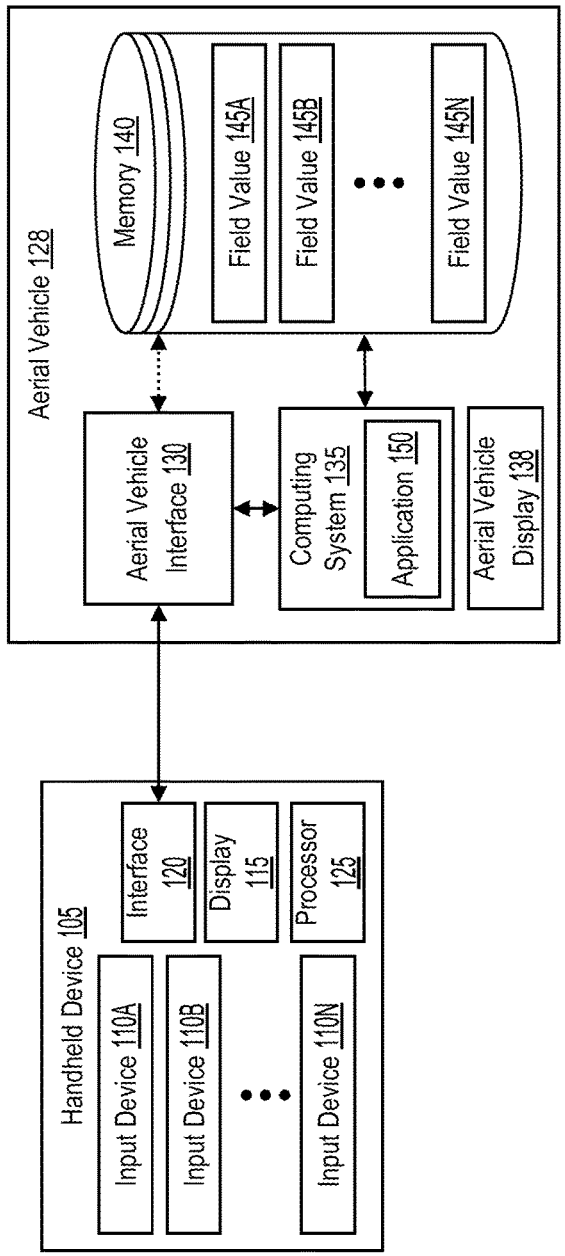
FIG. 1 is a block diagram of an example system including a handheld device for entering data and controlling functions of an aerial vehicle, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For purposes of reading the description of the various embodiments below, the following descriptions of the sections of the specification and their respective contents may be helpful:

Section A describes a handheld device and method for entering data and controlling functions of an aerial vehicle; and Section B describes a computer system to be used in implementing various components described herein.

A. Handheld Device for Entering Data and Controlling Functions of an Aerial Vehicle The systems, apparatuses, and methods of this technical solution provide a cockpit mission controller with integrated keyboard, which can be used to provide several different types of input to operate an aerial vehicle. To address the increased complexity of modern aerial vehicle missions, the cockpit mission controller can include several types of input devices, including a scroll wheel, a joystick-style input device, dedicated or multipurpose buttons, as well as an integrated keyboard. Techniques described herein allow for the cockpit mission controller to be a portable device that can be communicatively coupled with the fixed systems of the aerial vehicle using a wired or wireless interface. The cockpit controller can be mounted or tethered (or a combination) to any portion of the aerial vehicle to improve the controls available to operators of the aerial vehicle.

The advantages provided by the systems and methods described herein can include reduced weight and space utilization through the combination of several types of input devices in a single portable package. Additionally, the cockpit mission controller described herein allows operators of an aerial vehicle to interact with computing systems integrated with the aerial vehicle via handheld, integrated keyboard. The cockpit mission controller can include one or more display screens to facilitate the display of information as it is entered using the integrated keyboard or other input devices, while other input devices (e.g., a joystick, etc.) are being operated, allowing both data entry and aerial vehicle control in a single, portable device. Additionally, the cockpit controller includes a "scratch pad" memory, allowing the operator to observe data communicated to the fixed aerial vehicle systems without accessing a separate display or output of the aerial vehicle system. These and other improvements are detailed herein.

Referring now to FIG. 1, illustrated is a block diagram of a system 100 including a handheld device 105 for entering data and controlling functions of an aerial vehicle 128, in accordance with one or more implementations. In brief overview, the system 100 can include at least one handheld device 105 and at least one aerial vehicle 128. Although the block diagram depicts the handheld device 105 outside of the aerial vehicle 128, it should be understood that the handheld device 105 can be a portable handheld device that is operated within the aerial vehicle 128. The handheld device 105 can include one or more input devices 110A-110N (sometimes referred to herein as one or more input device(s) 110), a display 115, an interface 120, and a processor 125. The aerial vehicle 128 can include an aerial vehicle interface 130, a computing system 135, an aerial vehicle display 138, and a memory 140. The memory 140 can store one or more field values 145A-145N (sometimes referred to herein as one or more field value(s) 145). The handheld device 105, the processor 125, the computing system 135, or the memory 140, may be implemented at least in part using one or more of the components of the computer system 600 described in connection with FIG. 6.

The aerial vehicle 128 can be any type of aerial vehicle, such as an airplane, a helicopter, a drone, a vertical take-off and landing (VTOL) aircraft, or any other type of aerial vehicle. The aerial vehicle 128 can be operated by one or more pilots, for example, at least in part using the handheld device 105. The aerial vehicle 128 can be dispatched to address one or more remote issues by completing one or more assigned tasks, which may be performed in close proximity to environmental obstacles. Such assigned tasks can include, for example, combat tasks or taking off or landing in precarious environments, such as oil rigs. The aerial vehicle 128 may be equipped with any type of device or system that may be used to complete a task or mission that has been assigned to the aerial vehicle. The aerial vehicle can include one or more aerial vehicle interfaces 130, via which the aerial vehicle 128 or the computing system 135 can communicate with the handheld device 105.

The aerial vehicle 128 can include peripheral devices (not pictured), which may be controlled at least in part through user input via the handheld device 105 or via a fixed input device within the aerial vehicle 128. Such fixed input devices may be, for example, in communication with the computing system 135, which can send control signals to the peripheral devices. The peripheral devices can include weapons, cameras, sensors, signaling devices, or any other device that may be utilized on an aerial vehicle 128. The peripheral devices can be mounted to the exterior of the aerial vehicle 128, or may be fixed inside the aerial vehicle 128. The peripheral devices may be controlled (e.g., position, orientation, state, etc.) via signals received from the handheld device 105, via signals received via a fixed input device inside the aerial vehicle 128, or via signals received from the computing system 135.

The aerial vehicle 128 may include additional controls or output devices, such as the aerial vehicle display 138. The aerial vehicle display 138 can include one or more display devices, which may be any type of device capable of presenting information to a pilot (not pictured) that operates the aerial vehicle 128. The aerial vehicle display 138 can be positioned within the aerial vehicle 128 such that they can be viewed while the pilot is operating the aerial vehicle 128. The aerial vehicle display 138 can include devices that present specific sensor information, such as speed, direction, velocity, or location. The aerial vehicle display 138 can also be general display devices that can present information used in the techniques described herein, such as alerts or indications that the landing gear has been automatically lowered. The aerial vehicle display 138 can include an electronic flight instrument system (EFIS), which can include one or more primary flight displays, one or more multi-function displays, or other displays. The aerial vehicle display 138 may display mission information or video from peripheral devices of the aerial vehicle 128. Types of display devices can include liquid crystal displays (LCDs), light-emitting diode (LED) displays, organic light-emitting diode (OLED) displays, bi-stable displays (e.g., e-ink, etc.), among others.

The memory 140 can be a computer-readable memory that can store or maintain any of the information described herein. The memory can maintain one or more data structures, which may contain, index, or otherwise store each of the values, pluralities, sets, variables, vectors, numbers, or thresholds described herein. The memory 140 can be accessed using one or more memory addresses, index values, or identifiers of any item, structure, or region maintained in the memory 140. The memory 140 can be accessed by the computing system 135 (or the processor 125). In some implementations, other computing devices present on the aerial vehicle 128 can access the memory 140. The computing system 135 (or the processor 125) can store the results of any or all computations in one or more data structures in the memory 140, such that the data structures are indexed or identified with appropriate values for later access.

The memory 140 can store, in one or more data structure, one or more field values 145. The field values can be any machine-readable or modifiable value that can be presented to or modified by an operator of the aerial vehicle 128. Examples of field values can include values relating to the altitude, speed, or other status of the aerial vehicle 128. In some implementations, the field values 145 can correspond to one or more tasks assigned to the aerial vehicle 128. The field values can include information relating to the position or orientation of peripheral devices of the aerial vehicle, that when modified cause the computing system 135 to send signals to the peripheral devices to modify their position or orientation. The field values 145 can be modified by computing system 135, which can access the memory 140 of the aerial vehicle 128 through a suitable communications bus or interface. In some implementations, the handheld device 105 can transmit signals (as described in greater detail herein) to modify one or more of the field values 145. The signals can be received by the aerial vehicle interface 130. Upon receiving the signals, the aerial vehicle 128 can provide the signals to the computing system 135, which can modify the corresponding field values. In some implementations, the aerial vehicle interface 130 can modify the memory 140 directly, without necessarily providing the signals to the computing system 135.

The aerial vehicle interface 130 can be any type of communications interface that is capable of providing or receiving signals from external devices, such as the handheld device 105. Some examples of the aerial vehicle interface 130 can include an Ethernet interface, a serial interface, a universal serial bus (USB) interface, or a discrete signal interface. The discrete interface can be a fixed voltage serial or parallel interface (e.g., a 28 volt interface, etc.). In some implementations, the aerial vehicle interface 130 can provide or receive power via the aerial vehicle interface 130. For example, the aerial vehicle interface 130 can include one or more data lines, and one or more separate power lines. The data lines can be responsible for transmitting or receiving information, while the power lines can be responsible for transmitting or receiving power. In some implementations, the aerial vehicle interface 130 may provide power to the handheld device 105, or may receive power from the handheld device 105. In some implementations, the aerial vehicle interface 130 can be a wireless interface, such as a Bluetooth receiver-transmitter, a wireless fidelity (WiFi) communicator, a near-field communications communication device, or another type of wireless transmitter. The aerial vehicle interface 130 can wirelessly communicate information with a corresponding wireless interface 120 of the handheld device 105.

The computing system 135 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The computing system 135 can communicate with any of the components of the aerial vehicle 128, including the memory 140, display devices, and the aerial vehicle interface 130 to perform one or more of the operations described herein.

The computing system 135 can include any or all of the components and perform any or all of the functions of the computer system 600 described in connection with FIG. 6. The computing system 135 can receive signals from the handheld device 105 (e.g., instructions, etc.) to modify one or more of the field values 145. In response to the signals, the computing system 135 can modify the field values in accordance with the signals. In some implementations, the computing system 135 may periodically poll the aerial vehicle interface 130 to retrieve any information transmitted by or available to transmit from the handheld device 105. The computing system 135 may also control the attributes or operation of one or more peripheral devices of the aerial vehicle 128. For example, the computing system 135 may be communicatively coupled to actuators that control the position or orientation of a peripheral device, or may be communicatively coupled to the peripheral devices themselves (e.g., either through a communications bus, an aerial vehicle interface, or another type of interface). The computing system 135 can transmit signals to the peripheral devices to change their position, orientation, or to operate the peripheral devices. In some implementations, the computing system 135 can transmit such signals in response to corresponding instructions or input received from the handheld device 105. The computing system 135 may also transmit such signals in response to a change to a corresponding field value 145.

The computing system 135 can respond to requests received from the handheld device 105. For example, the computing system 135 can receive requests to list the content of one or more field values 145 stored in the memory of the aerial vehicle 128. In response to the request, the computing system 135 can retrieve the requested field values 145 from the memory, and transmit the retrieved field values 145 to the handheld device 105 via the aerial vehicle interface 130. The computing system 135 may also provide information relating to the field values 145 to the handheld device 105, such as a hierarchical storage structure (e.g., a directory structure, another type of data structure, etc.) of the field values, or sort one or more of the field values 145 according to their values, among other processing operations. The computing system 135 can transmit the information relating to the field values 145 to the handheld device 105 via the aerial vehicle interface 130.

To perform the operations described herein, the computing system 135 can execute an application 150 (which may be stored in the memory 140 and may execute on the computing system 135). The application 150 can receive input from the handheld device 105 via the aerial vehicle interface 130. The application 150 may be an aerial vehicle control application 150 that is at least partially responsible for maintaining, creating, deleting, or otherwise modifying or accessing the field values 145 in the memory 140. The application 150 may generate graphical user interfaces or display instructions to present graphical user interfaces. The graphical user interfaces may include information relating to the field values 145 or information included in the field values 145. The application 150 may generate display instructions to present one or more of the user interfaces at the display 115 of the handheld device 105, and transmit the display instructions to the handheld device 105 via the aerial vehicle interface 130. As described herein, the application 150 can receive input to modify or request (e.g., a command) information included in or relating to the field values 145 from the handheld device 105 (e.g., in response to input at one or more of the input devices 110). The application 150 can perform operations in accordance with the requested command, and may generate display instructions for the handheld device 105 to present a graphical user interface showing the result of the command (e.g., the modification of a field value 145, etc.).

The handheld device 105 can be a portable device that an operator of the aerial vehicle 128 can use to enter data and control mission functions by communicating with systems (e.g., the aerial vehicle interface 130, computing system 135, the memory 140, etc.) of the aerial vehicle. The handheld device 105 can include one or more input devices 110A. The input devices 110 can be any type of device capable of receiving user input from an operator of the aerial vehicle 128. Some examples of the input devices can include a keyboard (or individual keys or buttons on a keyboard), one or more buttons, a trigger, a scroll wheel, a joy stick, a trackball, or a touchpad, among others. The variety in types of input devices allow the operator of the handheld device 105 to control various aspects of the aerial vehicle 128, including performing data entry to modify one or more of the field values 145. Information relating to the field values 145 or other information transmitted to the handheld device 105 can be quickly navigated using a scroll wheel input device 110. A joystick input device 110 can be used to control one or more of the peripheral devices of the aerial vehicle, such as cameras or weapon systems (not pictured). In some implementations, the handheld device 105 can include a bracket or mount that couples the handheld device 105 to the interior of the aerial vehicle 128.

The handheld device 105 may also be portable, and may include a battery (e.g., a lithium ion, alkaline, nickel metal hydride, etc.) or another portable power source. The input devices 110 can generate corresponding input signals, which may correspond to the type of the respective input device 110, and provide the signals to the processor 125 or directly to the interface 120. For example, a joystick-type input device 110 may generate analog joystick signals, indicating a position of the joystick relative to a center position. A keyboard-type input device 110 can include several keys, each of which, when actuated by an operator, can generate a respective signal that may correspond to one of a letter, number, symbol, or aerial vehicle control input, among other keyboard functions (e.g., shift, control, alt, option, arrow keys, num-lock, scroll-lock, function keys, etc.). A scroll wheel-type input device 110 can, when actuated, generate signals indicating that the scroll wheel is being moved in an upward direction, a downward direction, or another direction. Similar inputs can be generated for other input devices 110 such as touchpads or touch screens (e.g., a location of the touch input, an amount of force corresponding to the touch input, a number of simultaneous touch inputs, indications of swipe or tap gestures, etc.).

The handheld device 105 can include a display 115. The display 115 can be any type of display capable of presenting information to an operator of the aerial vehicle 128. The display 115 may be, for example, an LCD, an LED display, an OLED display, or a thin-film-transistor (TFT) display, among others. The display 115 may be communicatively coupled to the processor 125, which can present information received from the computing system 135 (or retrieved from the memory 140) on the display 115. In some implementations, the display 115 may be a type of interactive display (e.g., a touchscreen, etc.) and may be or may include one or more input devices 110. The display 115 may be updated by the processor 125 at a predetermined update rate (e.g., 20 times per second, 30 times per second, etc.). In some implementations, the processor 125 can present information relating to input provided via the input devices 110 on the display 115, such as keyboard (e.g., letters or numbers) input.

The interface 120 can be any type of communications interface that is capable of providing or receiving signals to or from the aerial vehicle interface 130. Some examples of the interface 120 can include an Ethernet interface, a serial interface, a USB interface, or a discrete signal interface. The discrete interface can be a fixed voltage serial or parallel interface (e.g., a 28 volt interface, etc.). In some implementations, the handheld device 105 (or the components thereof) can provide or receive power via the interface 120. In some implementations, the interface 120 can be a wireless interface, such as a Bluetooth receiver-transmitter, a WiFi communicator, an NFC communication device, or another type of wireless transmitter. In such implementations, the interface 120 can wirelessly communicate information with the aerial vehicle interface 130 of the aerial vehicle 128. The interface 120 can be communicatively coupled to, and received and provide information to and from, the processor 125 (and in some implementations, the display 115). An overview of examples of the structure of the handheld device 105 is shown in FIGS. 2A, 2B, 2C, 3A, 3B, and 4.

Figure 2A:
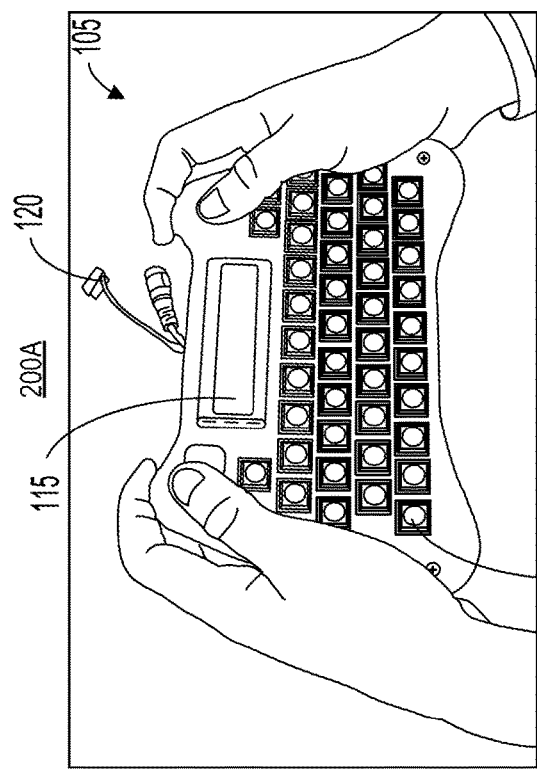
FIGS. 2A, 2B, and 2C depict example views of the handheld device for entering data and controlling functions of an aerial vehicle described in connection with FIG. 1, in accordance with one or more implementations.
Figure 2B:
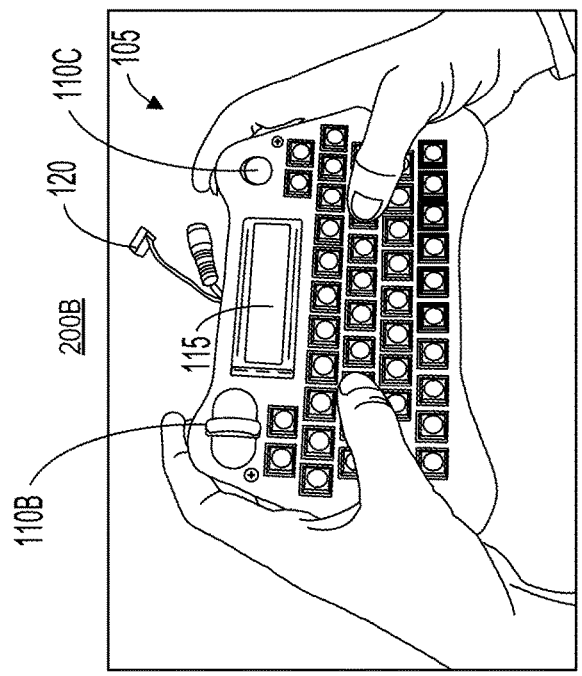
Figure 2C:
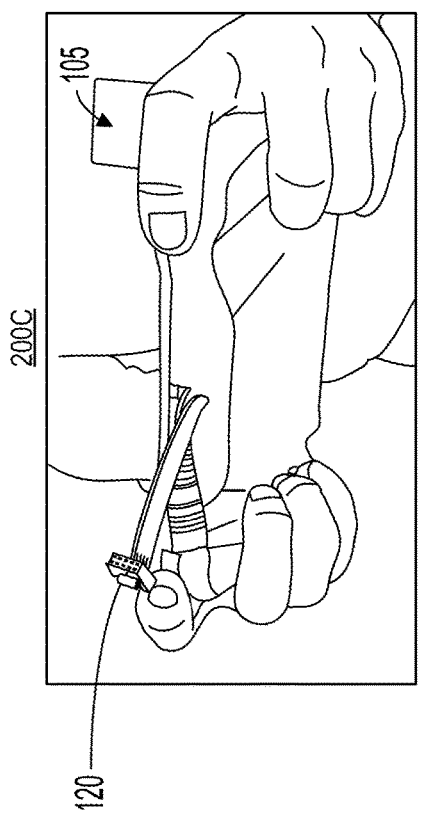

Referring to FIGS. 2A, 2B, and 2C, and others, illustrated are example views 200A, 200B, and 200C, respectively, of an example handheld device 105 as also described in FIG. 1, in accordance with one or more implementations. As shown in FIG. 2A, illustrated is a top view of the handheld device 105, which includes a keyboard input device 110A with several keys (e.g., which may correspond to number, letter, symbol inputs, or control inputs, and may include indicia indicating the same, etc.). The handheld device 105 can include at least a two-part housing, which exposes the input devices 110 and the display 115 to the operator, while maintaining the circuitry and other components of the handheld device 105 protected from the external environment. As shown in FIGS. 2A, 2B, and 2C, the housing of the handheld device 105 may include ergonomic grips, and may be manufactured from a material that is comfortable to hold during operation of an aerial vehicle. Some example materials used to manufacture the handheld device 105 can include polymer materials, metal materials, or composite materials, among others.

The handheld device 105 can include the interface 120, which is shown here as a wired interface with a connector that couples to a system on an aerial vehicle. The interface 120 can be a serial interface, a parallel interface, or a discrete signaling interface (e.g., a fixed voltage interface, etc.). The interface 120 may include separate interfaces for power and data, or may include a unified interface that includes both a power interface and a data interface. As shown in FIG. 2B, the handheld device can include additional input devices 110, including a scroll wheel input device 110B and a trackball input device 110C. However, it should be understood that the input devices 110A, 110B, and 100C are shown here as just examples of input devices 110, and that the handheld device 105 may include any number of input devices 110 of various types or configurations. The display 115, as shown here, is an LCD display that is capable of rendering one or more graphical user interfaces, which may include field values 145 received from the aerial vehicle 128. Referring to briefly to FIG. 3, illustrated is a perspective view 300 of the handheld device shown in FIGS. 2A, 2B, and 2C. As shown, the view 300 of the handheld device 105 shows the display 115 and the input devices 110A, 110B, and 110C, and the interface. In some implementations, the housing of the handheld device 105 may be waterproof, or may include protections against electrical shocks or surges from an external environment.

Figures 4A, 4B:
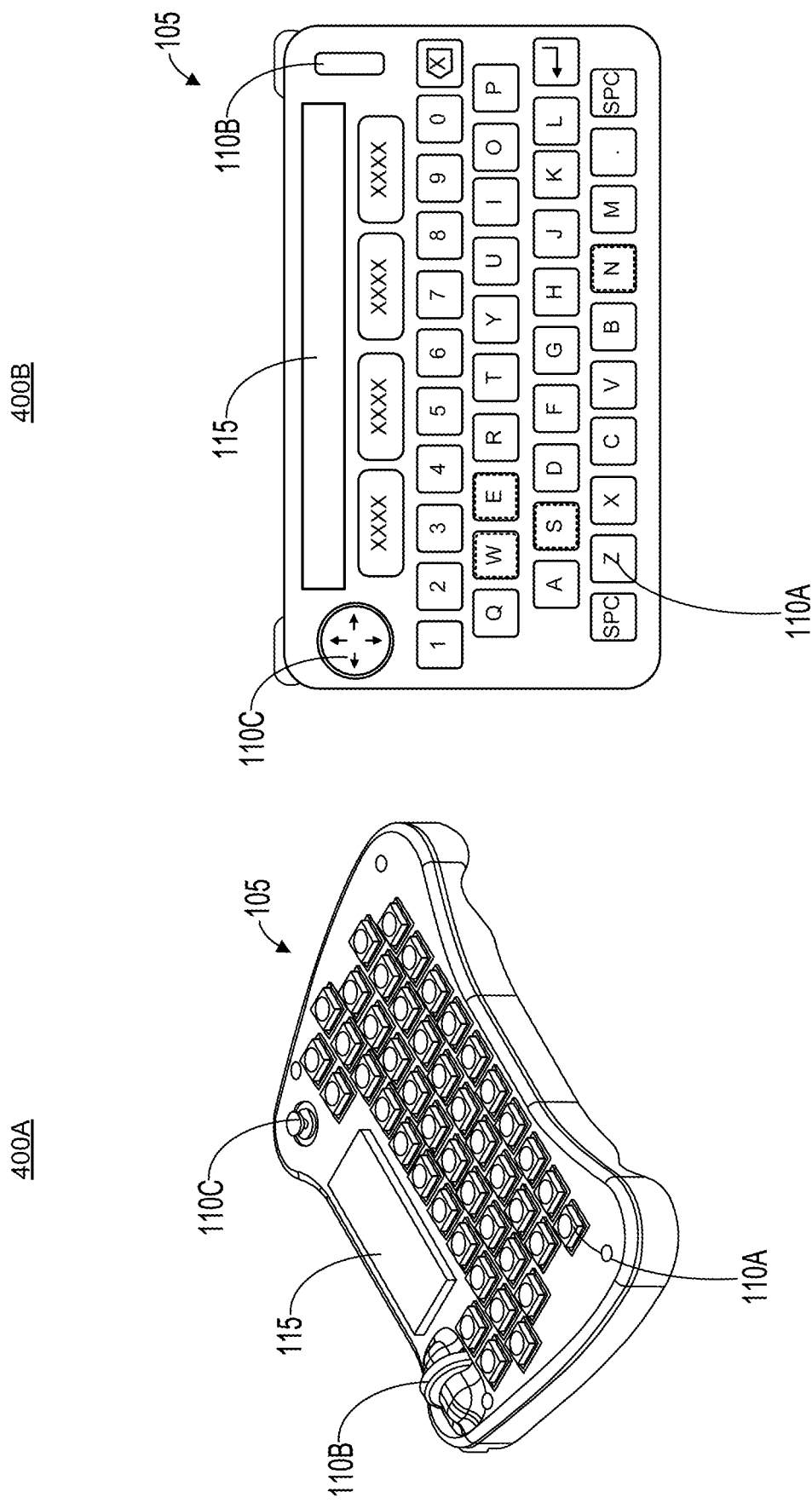
FIG. 4A depicts a perspective view of a three-dimensional model of the handheld device for entering data and controlling functions of an aerial vehicle described in connection with FIG. 1, in accordance with one or more implementations.
FIG. 4B depicts a perspective view of an alternative handheld device for entering data and controlling functions of an aerial vehicle, in accordance with one or more implementations.

Referring to FIGS. 4A and 4B, and others, illustrated are example views 400A and 400B, respectively, of alternative configurations of the handheld device 105. As shown in FIG. 4A, the handheld device 105 is similar to the example handheld device shown in FIGS. 2A, 2B, and 2C. The handheld device 105 shown in the view 400A includes a keyboard input device 110A, a scroll wheel input device 110B, and a joystick input device 110C. The display 115 is positioned above the keyboard input device 110A, between the joystick input device 110C and the scroll wheel input device 110B. Similar to the example handheld device 105 configuration shown in FIGS. 2A, 2B, and 2C, the handheld device 105 shown in view 400A includes an ergonomic grip portion on its housing. An alternative configuration of the handheld device 105 is shown in view 400B of FIG. 4B, which includes an alternative housing design and input devices. As shown in the view 400B, the handheld device 105 includes a keyboard input device 110A, a directional pad (e.g., a button-based input pad with at least four directions) input device 110B, and a scroll wheel input device 110C. The display 115 is positioned between the input devices 110B and 110C. As shown, the keyboard input device 110A includes at least four input functional input keys labelled "XXXX." In some implementations, one or more keys of the keyboard input device 110A can include a custom display device, similar to the display 115, which can allow custom characters, numbers, or symbols to be displayed on each key (e.g., based on signals received from the aerial vehicle 128 or from an internal configuration setting stored in a memory of the handheld device 105).

Referring back to FIG. 1, the handheld device 105 can include at least one processor 125 and a memory (e.g., a processing circuit). The memory can store processor-executable instructions that, when executed by processor, cause the processor to perform one or more of the operations described herein. The processor may include a microprocessor, an ASIC, an FPGA, one or more microcontrollers, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, combinations thereof, or any other suitable memory from which the processor can read instructions. The instructions may include code from any suitable computer programming language. The processor 125 can communicate with any of the components of the handheld device 105, including the input devices 110, the display 115, and the interface 120 to perform one or more of the operations described herein.

The processor 125 can include any or all of the components and perform any or all of the functions of the computer system 600 described in connection with FIG. 6. The processor 125 can detect or receive input data from the input devices 110. Upon detecting input at one or more of the input devices 110, the processor 125 can transmit one or more signals corresponding to the input device 110 to the aerial vehicle 128 via the interface 120. Some example signals can be, for example, signals to navigate a menu or graphical user interface provided by the aerial vehicle 128, signals to create, modify, access, or delete (among other commands) one or more field values 145, or signals to control one or more peripheral devices at the aerial vehicle 128. In some implementations, the signals may merely identify the corresponding input device 110 (and any associated input information such as joystick position, touchpad touch position or pressure, among others) at which input was detected, and the application 150 executing on the computing system 135 of the aerial vehicle 128 can identify a corresponding command or action to perform that is associated with the respective input device 110 (e.g., using a lookup table or configurable mapping stored in the memory 140).

In response to the signals from the input devices 110, can provide one or more of the signals to the interface 120 for transmission to the aerial vehicle. The generated signals may correspond to one or more commands provided to an application 150 executing on the computing system 135 of the aerial vehicle 128. The processor 125 can receive display instructions (e.g., output data) from the aerial vehicle 128 via the interface 120, and can present one or more graphical user interfaces on the display 115 in accordance with the display instructions. The display instructions may include, for example, commands to draw one or more predetermined shapes or text at identified locations on the display 115. In some implementations, the processor 125 can itself generate display instructions based on input detected at the input devices 110. For example, the processor 125 may display characters typed on a keyboard input device 110 on the display 115, without necessarily receiving corresponding display instructions from the aerial vehicle 128. However, display instructions (e.g., output data) may also be generated by the aerial vehicle 128 to present one or more characters or symbols input at a keyboard input device 110.

In some implementations, the processor 125 can transmit (e.g., periodically, in response to a polling request, in response to an interaction with the input devices 110, etc.) the one or more signals provided via the input devices 110 to the aerial vehicle 128, for example, to modify a field value 145 maintained in the memory 140. The signals can be transmitted via the interface 120. For example, the processor 125 may store a record of the input signals in a local memory, and transmit the contents of the memory to the aerial vehicle 128 (e.g., in the order that the input was provided) on a periodic basis, in response to an input at the input devices 110, or in response to another type of trigger condition. In some implementations, the processor 125 may transmit signals on a periodic basis regardless of whether input was detected at the input devices 110. For example, the processor 125 can generate a data structure that includes a corresponding value for each input device 110 of the handheld device 105. The corresponding value may be a binary value that indicates, for example, a state of the input device, such as whether a corresponding input device 110 (e.g., a button, key on a keyboard, etc.) has been actuated or pressed. For example, a binary value of '1' can indicate that the corresponding input device 110 has been pressed, while a binary value of '0' can indicate that the corresponding input device 110 has not been pressed. Other values are also possible, for example, a scalar value for one or more axes of a joystick input device 110, a value indicating a relative or absolute position of a scroll wheel input device 110, a value indicating a scroll velocity of a scroll wheel input device 110, or a value indicating a touch location or swipe direction on a touchpad or touchscreen input device 110, among others. The input devices 110 to which the values in the data structure correspond may be encoded according to the position of the values in the data structure, or the data structure may include an explicit association between an input device 110 and its corresponding value.

The processor 125 can transmit one or more signals to the aerial vehicle 128 via the interface, for example, in response to an input at one of the input devices 110 or in response to a triggering event. If a data structure is generated, the processor 125 can transmit the data structure to the aerial vehicle 128 via the interface 120 in response to one or more conditions. For example, in some implementations, the processor 125 can generate the data structure in response to detecting a change to the state (e.g., an input or changing from providing input to not providing input) of one or more of the input devices 110. Upon generating the data structure, the processor can transmit the data structure to the aerial vehicle 128 via the interface 120. In some implementations, the processor 125 can periodically transmit the data structure including the signals to the aerial vehicle 128 via the interface 120, for example, regardless of whether a change in the state of one or more of the input devices 110 is detected. The data structure may be generated or transmitted, for example, at a predetermined frequency (e.g., 20 times per second, 30 times per second, 60 times per second, etc.). The predetermined frequency may be configurable via input to the handheld device 105, or via a configuration setting at the computing system 135 of the aerial vehicle. The computing system 135 can receive and parse the data structure (e.g., which includes the signals and values corresponding to the one or more input devices 110), and can perform one or more corresponding actions or commands in response to the input. For example, the processor 125 can generate display instructions (e.g., a menu that can be navigated using the handheld device 105), modify a field value 145, control one or more peripheral devices of the aerial vehicle 128, or any other operation described herein.

In some implementations, the computing system 135 can generate and transmit display instructions that include a field value 145 that is being modified via the input devices 110, to the handheld device 105 via the aerial vehicle interface 130. Upon receiving the display instructions, the processor 125 can present the field value 145 being modified on the display device as the field value is modified. This allows an operator of the handheld device 105 to view one or more field values as they are being modified without attending to a different display of the computing system 135. To modify one or more field values, the processor 125 can communicate one or more input signals to the computing system 135 to select a field value 145 in response to receiving input via one or more of the input devices 110. The input may be, for example, input to navigate a graphical menu (the display instructions for which may be generated and transmitted by the computing system 135).

To select a field value 145, the computing system 135 can retrieve a field value 145 indicated via the input signals at the handheld device 105 from the memory 140 of the aerial vehicle. The computing system 135 can transmit the selected field value 145 to the handheld device 105 for display, for example, as raw data or as part of generated display instructions. The processor 125 of the handheld device 105 can receive the field value 145 via the interface 120, and present the field value 145 at the display 115. In some implementations, the handheld device 105 may store the field value in a local memory of the handheld device 105. In response to input signals (e.g., keyboard input, etc.) generated by one or more of the input devices 110, the processor 125 can modify the field value 145 stored in the local memory of the handheld device 105 in accordance with the input signals. Modifications to the locally stored field value 145 can be presented by the processor 125 to an operator of the handheld device 105 via the display 115. Upon detection of an input at one or more of the input devices 110 that indicates modification of the locally stored field value 145 is complete (e.g., actuation of a send button, a return button, or an enter button, etc.), the processor 125 can transmit the one or more signals to modify the corresponding field value 145 (e.g., replace the field value 145) in the memory 140 of the aerial vehicle 128 with the now-modified version of the field value 145 stored in the local memory of the handheld device 105. This allows modification of a field value 145 in the memory of the aerial vehicle 128 after displaying the output data corresponding to the modified field value 145 in the local memory of the handheld device 105 at the display 115. The local memory, and modifications of the field values 145 stored therein, may be referred to as a "scratch pad." The scratch pad memory allows for local modifications of a field value 145 without necessarily modifying the corresponding field value 145 stored in the memory 140. In some implementations, the modifications to the scratch pad may be mirrored with corresponding changes to the corresponding field value 145 in the memory 140, for example, via the transmission of one or more signals to the aerial vehicle 128.

Figure 5:
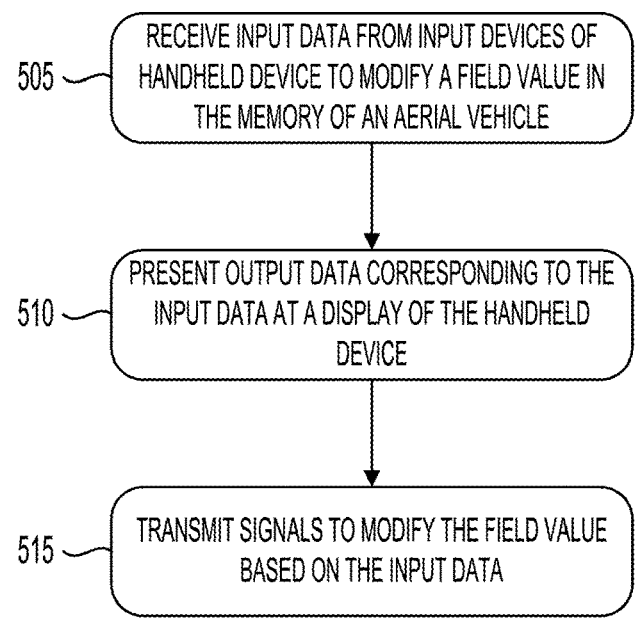
FIG. 5 depicts an example flow diagram of a method for entering data and controlling functions of an aerial vehicle using a handheld device, in accordance with one or more implementations.

Referring now to FIG. 5, illustrated is an example flow diagram of a method 500 for entering data and controlling functions of an aerial vehicle (e.g., the aerial vehicle 128) using a handheld device (e.g., the handheld device 105), in accordance with one or more implementations. The method 500 can be executed, performed, or otherwise carried out by the processor 125 of the handheld device 105 described in connection with FIGS. 1-4, the computer system 600 described herein in conjunction with FIG. 6, or any other computing devices described herein. In brief overview, at step 505, the method 500 includes receiving input data from input devices (e.g., the input devices 110) of a handheld device to modify a field value (e.g., a field value 145) in the memory (e.g., the memory 140) of an aerial vehicle (e.g., the aerial vehicle 128), at step 510 the method 500 includes presenting output data corresponding to the input data at a display (e.g., the display 115) of the handheld device, and at step 515, the method 500 includes transmitting signals to modify the field value based on the input data.

In further detail, at step 505, the method 500 includes receiving input data from input devices (e.g., the input devices 110) of a handheld device to modify a field value (e.g., a field value 145) in the memory (e.g., the memory 140) of an aerial vehicle (e.g., the aerial vehicle). The handheld device (or a processor thereof) can detect or receive input data from the input devices. Upon detecting input at one or more of the input devices, the handheld device can transmit one or more signals corresponding to the input device to the aerial vehicle via an interface (e.g., the interface 120). Some example signals can be, for example, signals to navigate a menu or graphical user interface provided by the aerial vehicle, signals to create, modify, access, or delete (among other commands) one or more field values, or signals to control one or more peripheral devices at the aerial vehicle. In some implementations, the signals may merely identify the corresponding input device (and any associated input information such as joystick position, touchpad touch position or pressure, among others) at which input was detected, and an application (e.g., the application 150) executing on a computing system of the aerial vehicle can identify a corresponding command or action to perform that is associated with the respective input device (e.g., using a lookup table or configurable mapping stored in the memory of the aerial vehicle). In response to the signals from the input devices, can provide one or more of the signals to the interface for transmission to the aerial vehicle. The generated signals may correspond to one or more commands provided to an application executing on the computing system of the aerial vehicle.

At step 510 the method 500 includes presenting output data corresponding to the input data at a display (e.g., the display 115) of the handheld device. The handheld device can receive display instructions (e.g., output data) from the aerial vehicle via the interface, and can present one or more graphical user interfaces on the display in accordance with the display instructions. The display instructions may include, for example, commands to draw one or more predetermined shapes or text at identified locations on the display. In some implementations, the handheld device can itself generate display instructions based on input detected at the input devices. For example, the handheld device may display characters typed on a keyboard input device on the display, without necessarily receiving corresponding display instructions from the aerial vehicle. However, display instructions (e.g., output data) may also be generated by the aerial vehicle to present one or more characters or symbols input at a keyboard input device.

At step 515, the method 500 includes transmitting signals to modify the field value based on the input data. The handheld device can transmit (e.g., periodically, in response to a polling request, in response to an interaction with the input devices 110, etc.) the one or more signals provided via the input devices to the aerial vehicle, for example, to modify a field value maintained in the memory of the aerial vehicle. The signals can be transmitted via the interface of the handheld device. For example, the handheld device may store a record of the input signals in a local memory, and transmit the contents of the memory to the aerial vehicle (e.g., in the order that the input was provided) on a periodic basis. In some implementations, the handheld device may transmit periodic signals on a periodic basis regardless of whether input was detected at the input devices. For example, the handheld device can generate a data structure that includes a corresponding value for each input device of the handheld device. The corresponding value may be a binary value that indicates, for example, a state of the input device, such as whether a corresponding input device (e.g., a button, key on a keyboard, etc.) has been actuated or pressed. For example, a binary value of '1' can indicate that the corresponding input device has been pressed, while a binary value of '0' can indicate that the corresponding input device has not been pressed. Other values are also possible, for example, a scalar value for one or more axes of a joystick input device, a value indicating a relative or absolute position of a scroll wheel input device, a value indicating a scroll velocity of a scroll wheel input device, or a value indicating a touch location or swipe direction on a touchpad or touchscreen input device, among others. The input devices to which the values in the data structure correspond may be encoded according to the position of the values in the data structure, or the data structure may include an explicit association between an input device and its corresponding value.

The handheld device can transmit the data structure to the aerial vehicle via the interface of the handheld device in response to one or more conditions. For example, in some implementations, the handheld device can generate the data structure in response to detecting a change to the state (e.g., an input or changing from providing input to not providing input) of one or more of the input devices. Upon generating the data structure, the processor can transmit the data structure to the aerial vehicle via the interface of the handheld device. In some implementations, the handheld device can periodically transmit the data structure including the signals to the aerial vehicle via the interface of the handheld device, for example, regardless of whether a change in the state of one or more of the input devices is detected. The data structure may be generated or transmitted, for example, at a predetermined frequency (e.g., 20 times per second, 30 times per second, 60 times per second, etc.). The predetermined frequency may be configurable via input to the handheld device, or via a configuration setting at the computing system of the aerial vehicle. The computing system of the aerial vehicle can receive and parse the data structure (e.g., which includes the signals and values corresponding to the one or more input devices), and can perform one or more corresponding actions or commands in response to the input. For example, the handheld device can generate display instructions (e.g., a menu that can be navigated using the handheld device), modify a field value, control one or more peripheral devices of the aerial vehicle, or any other operation described herein.

In some implementations, the computing system of the aerial vehicle can generate and transmit display instructions that include a field value that is being modified via the input devices, to the handheld device via the aerial vehicle interface. Upon receiving the display instructions, the handheld device can present the field value being modified on the display device as the field value is modified. This allows an operator of the handheld device to view one or more field values as they are being modified without attending to a different display of the computing system of the aerial vehicle. To modify one or more field values, the handheld device can communicate one or more input signals to the computing system of the aerial vehicle to select a field value in response to receiving input via one or more of the input devices. The input may be, for example, input to navigate a graphical menu (the display instructions for which may be generated and transmitted by the computing system of the aerial vehicle).

To select a field value, the computing system of the aerial vehicle can retrieve a field value indicated via the input signals at the handheld device from the memory of the aerial vehicle. The computing system of the aerial vehicle can transmit the selected field value to the handheld device for display, for example, as raw data or as part of generated display instructions. The handheld device of the handheld device can receive the field value via the interface 120, and present the field value at the display of the handheld device. In some implementations, the handheld device may store the field value in a local memory of the handheld device. In response to input signals (e.g., keyboard input, etc.) generated by one or more of the input devices, the handheld device can modify the field value stored in the local memory of the handheld device in accordance with the input signals. Modifications to the locally stored field value can be presented by the handheld device to an operator of the handheld device via the display of the handheld device. Upon detection of an input at one or more of the input devices that indicates modification of the locally stored field value is complete (e.g., actuation of a send button, a return button, or an enter button, etc.), the handheld device can transmit the one or more signals to modify the corresponding field value (e.g., replace the field value) in the memory of the aerial vehicle with the now-modified version of the field value stored in the local memory of the handheld device. This allows modification of a field value in the memory of the aerial vehicle after displaying the output data corresponding to the modified field value in the local memory of the handheld device at the display device of the handheld device.

B. Computer System

Figure 6:
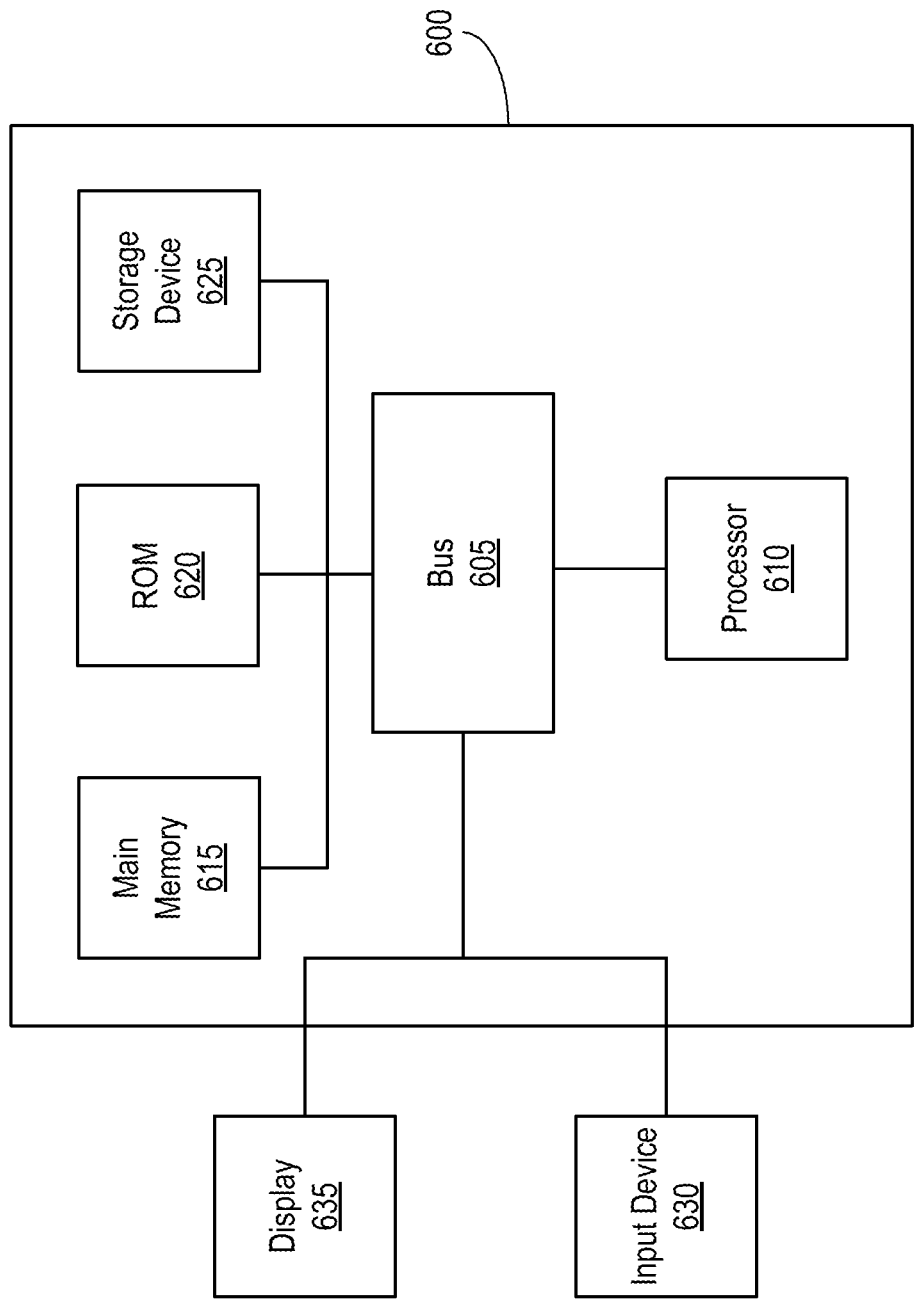
FIG. 6 illustrates a block diagram of an example computer system useful in implementing one or more components detailed herein.

Referring now to FIG. 6, depicted is a block diagram of an example computer system 600. The computer system or computing device 600 can include or be used to implement portions of the handheld device 105 or the computing system 135 described in connection with FIG. 1. The computing system 600 includes at least one bus 605 or other communication component for communicating information and at least one processor 610 or processing circuit coupled to the bus 605 for processing information. The computing system 600 can also include one or more processors 610 or processing circuits coupled to the bus 605 for processing information. The computing system 600 also includes at least one main memory 615, such as a RAM or other dynamic storage device, coupled to the bus 605 for storing information, and instructions to be executed by the processor 610. The computing system 600 may further include at least one ROM 620 or other static storage device coupled to the bus 605 for storing static information and instructions for the processor 610. A storage device 625, such as a solid state device, magnetic disk, or optical disk, can be coupled to the bus 605 to persistently store information and instructions.

The computing system 600 may be coupled via the bus 605 to a display 635, such as a liquid crystal display, or active matrix display, for displaying information to a user such as an administrator of the data processing system. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the display 115, or other components of FIG. 1.

The processes, systems, and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA, a GPU, or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A handheld device for entering data and controlling functions of an aerial vehicle, comprising:
    an interface that communicates with a processor and a memory of the aerial vehicle;
    a plurality of input devices that receive input from an operator of the handheld device;
    a display device that displays information related to the input received from the operator via the plurality of input devices; and one or more processors, in communication with the plurality of input devices and the display device, configured to:
- receive input data from one or more of the plurality of input devices to modify a field value maintained in the memory of the aerial vehicle;
- present, at the display device, output data corresponding to the input data;
- transmit one or more signals to modify the field value maintained in the memory of the aerial vehicle via the interface based on the input data;
- generate a data structure comprising a respective binary value corresponding to a state of each of the plurality of input devices; and
- periodically transmit, via the interface to the processor of the aerial vehicle, the data structure at a predetermined frequency irrespective of input to the plurality of input devices.

2. The handheld device of claim 1, wherein the plurality of input devices comprises a scroll wheel.

3. The handheld device of claim 1, wherein the plurality of input devices comprises a joystick.

4. The handheld device of claim 1, wherein the one or more signals are configured to control a camera of the aerial vehicle or a weapon system of the aerial vehicle.

5. The handheld device of claim 1, wherein the interface is one of an Ethernet interface, a serial interface, or a discrete signal interface.

6. The handheld device of claim 1, comprising a mount that couples the handheld device to the aerial vehicle.

7. The handheld device of claim 1, wherein the one or more processors are further configured to present the field value on the display device as the field value is modified.

8. The handheld device of claim 1, wherein the one or more processors are further configured to communicate with a software layer executed by the processor of the aerial vehicle to select the field value in response to receiving a second input via the plurality of input devices.

9. The handheld device of claim 1, wherein the one or more processors are further configured to receive, via the interface, the field value maintained in the memory of the aerial vehicle for display at the display device.

10. The handheld device of claim 1, wherein the one or more processors are further configured to periodically transmit the one or more signals to modify the field value in the memory of the aerial vehicle.

11. The handheld device of claim 1, wherein the one or more processors are further configured to:
- receive, via the interface, one or more field values from the processor of the aerial vehicle; and
- display, at the display device, the one or more field values in a menu.

12. A method, comprising:
- receiving, by one or more processors of a handheld device comprising a display device and a plurality of input devices, input data from one or more of the plurality of input devices to modify a field value maintained in a memory of an aerial vehicle in communication with the handheld device;
- presenting, by the one or more processors at the display device, an output data corresponding to the input data;
- transmitting, by the one or more processors via an interface, one or more signals to modify the field value maintained in the memory of the aerial vehicle via the interface based on the input data;
- generating, by the one or more processors, a data structure comprising a respective binary value corresponding to a state of each of the plurality of input devices; and
- periodically transmitting, by the one or more processors via the interface to a processor of the aerial vehicle, the data structure at a predetermined frequency irrespective of input to the plurality of input devices.

13. The method of claim 12, wherein the plurality of input devices comprises a joystick or a scroll wheel, and further comprising receiving, by the one or processors, a signal to control a camera or a weapon system of the aerial vehicle via the joystick or the scroll wheel.

14. The method of claim 12, wherein periodically transmitting the one or more signals is performed via an Ethernet interface, a serial interface, or a discrete signal interface.

15. The method of claim 12, further comprising presenting, by the one or more processors, the field value on the display device as the field value is modified.

16. The method of claim 12, further comprising communicating, by the one or more processors, with a software layer executed by a processor of the aerial vehicle to select the field value in response to receiving a second input via the plurality of input devices.

17. The method of claim 12, further comprising receiving, by the one or more processors via the interface, the field value maintained in the memory of the aerial vehicle for display at the display device.

18. The method of claim 12, further comprising transmitting, by the one or more processors, the one or more signals to modify the field value in the memory of the aerial vehicle after displaying the output data at the display device and responsive to receiving a second input from at least one of the plurality of input devices.

* * * * *